United States Patent
Takada

(10) Patent No.: US 10,852,465 B2
(45) Date of Patent: Dec. 1, 2020

(54) POLARIZING PLATE AND POLARIZING PLATE MANUFACTURING METHOD

(71) Applicant: DEXERIALS CORPORATION, Tokyo (JP)

(72) Inventor: Akio Takada, Miyagi (JP)

(73) Assignee: DEXERIALS CORPORATION, Tokyo (JP)

( * ) Notice: Subject to any disclaimer, the term of this patent is extended or adjusted under 35 U.S.C. 154(b) by 102 days.

(21) Appl. No.: 16/370,786

(22) Filed: Mar. 29, 2019

(65) Prior Publication Data
US 2019/0331840 A1  Oct. 31, 2019

(30) Foreign Application Priority Data

Apr. 25, 2018 (JP) .................. 2018-083984

(51) Int. Cl.
*G02B 5/30* (2006.01)
(52) U.S. Cl.
CPC .................. *G02B 5/3058* (2013.01)
(58) Field of Classification Search
CPC .................................... G02B 5/3058
USPC ................. 359/485.05, 487.03, 900
See application file for complete search history.

(56) References Cited

U.S. PATENT DOCUMENTS

| | | | | |
|---|---|---|---|---|
| 7,046,441 B2* | 5/2006 | Huang | ............... | G02B 3/0037 359/485.05 |
| 7,142,363 B2* | 11/2006 | Sato | ............... | G01J 3/18 359/569 |
| 7,746,425 B2* | 6/2010 | Atsushi | ............... | G02B 5/3058 349/96 |
| 8,248,697 B2* | 8/2012 | Kenmochi | ............... | G02B 5/1857 359/485.05 |
| 2007/0217008 A1* | 9/2007 | Wang | ............... | G02B 5/1809 359/485.05 |
| 2009/0040607 A1* | 2/2009 | Amako | ............... | G02B 5/1809 359/485.01 |
| 2009/0168170 A1* | 7/2009 | Huang | ............... | G02B 5/3058 359/485.05 |
| 2013/0258471 A1* | 10/2013 | Davis | ............... | G02B 5/3058 359/485.05 |
| 2015/0116824 A1* | 4/2015 | Wang | ............... | G02B 1/08 359/485.05 |
| 2020/0166683 A1* | 5/2020 | Liu | ............... | G02B 5/3058 |
| 2020/0174172 A1* | 6/2020 | Dong | ............... | G02B 5/3058 |

FOREIGN PATENT DOCUMENTS

JP  2012-103728 A  5/2012

* cited by examiner

*Primary Examiner* — Ricky D Shafer
(74) *Attorney, Agent, or Firm* — Oliff PLC

(57) ABSTRACT

A polarizing plate capable of achieving high reliability and a method for manufacturing a polarizing plate. The polarizing plate includes a transparent substrate that is transparent to light of a used wavelength band; a metal grid in which a reflective layer made of a metal is arranged to extend in a predetermined direction on the transparent substrate at a pitch finer than a wavelength of light of the used band; a metal subgrid made of the same metal as the reflective layer formed on the metal grid at a pitch finer than that of the metal grid; and an absorbing layer made by filling a light absorbing material into a recess of the metal subgrid.

15 Claims, 5 Drawing Sheets

POLARIZING PLATE AND POLARIZING PLATE MANUFACTURING METHOD

TECHNICAL FIELD

The present disclosure relates to a wire grid polarizing plate and to a method for manufacturing a wire grid polarizing plate.

BACKGROUND ART

Wire grid polarizing plates are highly durable and thus suited for applications such as liquid crystal projectors having high light densities. In such polarizing plates, an important optical property requirement is low reflectance. High reflectance might otherwise cause a liquid crystal panel to malfunction or degrade image quality with stray light.

In recent years, polarizing plates having lower reflectance have been desired due to increased brightness and definition in liquid crystal projectors. Wire grid polarizing plates are provided with, for example, a reflective layer, a dielectric layer, and an absorbing layer; reflectance of s-polarized light parallel with the wire grid is suppressed using absorption effects of an upper portion constituted by the dielectric layer and absorbing layer as well as with interference effects of the three layers (for example, see PLT 1).

CITATION LIST

Patent Literature

PLT 1: Japanese Unexamined Patent Application Publication No. 2012-103728

SUMMARY OF INVENTION

Technical Problem

Furthermore, high transmittance is a desired optical property in polarizing plates. Particularly, recent years have seen a trend of increased brightness in liquid crystal projectors in which high transmittance is an important property together with low reflectance.

Although light absorbing effects in the three-layer structure described above act primarily on s-polarized light, some of the p-polarized light component is also absorbed, thus reducing transmittance. Moreover, transmittance in the three-layer structure described above depends on pitch of the grid and is increased by reducing the pitch.

However, reducing the pitch of the three-layer structure described above also reduces the width of the grid and thus contact area among films of the three laminated layers. Therefore, for example, in cases of laminating an oxide film or additional absorbing films such as of metal on a metal film, bond strength is reduced by this decreased contact area, which might harm reliability.

The present technology has been proposed in view of such circumstances and provides a polarizing plate and a method for manufacturing a polarizing plate capable of achieving high reliability.

Solution to Problem

In view of the foregoing, a polarizing plate according the present technology includes a transparent substrate that is transparent to light of a used wavelength band; a metal grid in which a reflective layer made of a metal is arranged to extend in a predetermined direction on the transparent substrate at a pitch finer than a wavelength of light of the used band; a metal subgrid made of the metal formed on the metal grid at a pitch finer than that of the metal grid; and an absorbing section including a light absorbing material formed on the metal subgrid.

Furthermore, a method for manufacturing a polarizing plate according to the present technology includes forming a subgrid pattern on a surface of a metal layer film-formed on a transparent substrate that is transparent to light in a used wavelength band; forming an absorbing layer by filling a light absorbing material in a recess of the subgrid pattern; and forming a grid pattern arranged to be at a pitch finer than a wavelength of light in the used band by etching a metal layer, to manufacture a polarizing plate having the transparent substrate, a metal grid extending in a predetermined direction in which a reflective layer made of a metal is arranged on the transparent substrate at a pitch finer than the wavelength of light of the used band, a metal subgrid made of the metal formed on the metal grid at a pitch finer than that of the metal grid, and an absorbing section formed by filling a light absorbing material in a recess of the metal subgrid.

Furthermore, a method for manufacturing a polarizing plate according to the present technology includes forming a subgrid pattern on a surface of a metal film layer film-formed on a transparent substrate that is transparent to light in a used wavelength band; forming a grid pattern arranged at a pitch finer than a wavelength of light in the used band by etching a metal layer; and vapor depositing a light absorbing material on an upper portion of the subgrid pattern, to manufacture a polarizing plate having the transparent substrate, a metal grid extending in a predetermined direction in which a reflective layer made of a metal is arranged on the transparent substrate at a pitch finer than the wavelength of light of the used band, a metal subgrid made of the metal formed on the metal grid at a pitch finer than that of the metal grid, and an absorbing section formed by vapor depositing a light absorbing material on an upper portion of the metal subgrid.

Advantageous Effects of Invention

According to the present technology, increased contact area with the metal subgrid is capable of improving bond strength between the metal subgrid and the absorbing section to achieve high reliability.

DESCRIPTION OF EMBODIMENTS

Figure 1:
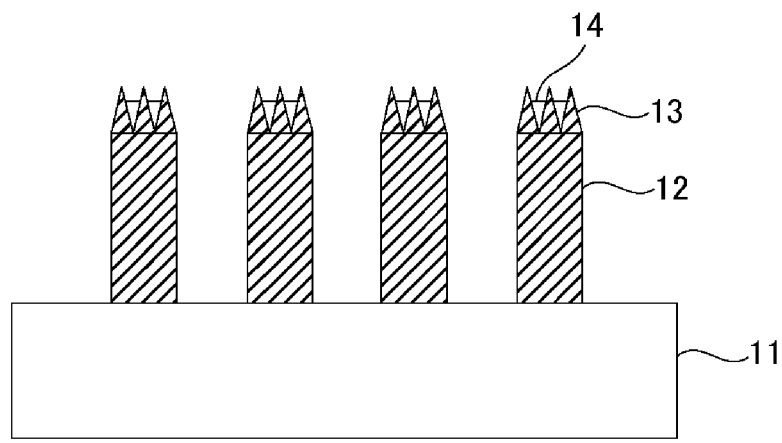
FIG. 1 is a cross-sectional view schematically illustrating a structure of a polarizing plate according to a first embodiment.

Embodiments of the present technology will now be described in detail according to the following order with reference to the drawings.
1. Polarizing Plate
2. Polarizing Plate Manufacturing Method
1. Polarizing Plate A polarizing plate according to the present embodiment includes a transparent substrate that is transparent to light of a used wavelength band, a metal grid in which a reflective layer made of a metal is arranged to extend in a predetermined direction on the transparent substrate at a pitch finer than a wavelength of light of the used band, a metal subgrid made of the metal formed on the metal grid at a pitch finer than that of the metal grid; and an absorbing section including a light absorbing material formed on the metal subgrid. According to such a polarizing plate, increased contact area with the metal subgrid can improve bond strength between the metal subgrid and the absorbing section and can maintain both optical properties and reliability in a polarizing plate having a fine pitch.

In the metal grid, the pitch of the reflective layer is one half or less of a wavelength of the used wavelength band. This allows the polarizing plate to achieve good polarizing effects such as for use in a liquid crystal projector. For example, in the case of using a wavelength band having a shortest wavelength in the blue band at 400 nm, the pitch would be 200 nm or finer, and in the case of a 1:1 ratio between width of the reflective layer and space width of the metal grid, the width of the reflective layer would be 100 nm or less.

The metal grid is formed by arranging a reflective layer of metal thin-film in a striped pattern extending in the Y direction, which is the absorption axis. The reflective layer thus functions as a wire grid polarizer that, for light propagating toward and entering the surface of the transparent substrate on which the wire grid is formed, attenuates polarized waves (TE waves (s-waves)) having an electric field component in a direction (Y direction) parallel to the lengthwise direction of the wire grid and transmits polarized waves (TM waves (p-waves)) having an electric field component in a direction (X direction) perpendicular to the lengthwise direction of the wire grid.

The metal subgrid is formed on the reflective layer and has a pitch finer than that of the metal grid. Because the purpose of the metal subgrid is to increase surface area, the pitch of the metal subgrid is not necessarily required to be an integral ratio; however, one or more periods are preferable in view of symmetry.

The pitch P of the metal subgrid preferably satisfies Inequality (1) given below in which A represents the pitch of the metal grid and D represents a duty ratio (reflective layer width G/metal grid pitch A).

$$P < D*A/2 \quad (1)$$

Pitch of the metal subgrid is thus preferably less than one half of the reflective layer width G. In this way, it is possible to improve bond strength between the metal subgrid and the absorbing section to achieve increased reliability even in the case of the width of the reflective layer being 100 nm or less.

Depth of a recess of the metal subgrid is preferably one half or less of the height of a projection of the metal grid. This can maintain strength of the reflective layer.

The absorbing section attenuates TE waves by having a polarization-selective light-absorbing effect. By appropriately adjusting the configuration of the absorbing section, it is possible to partially reflect TE waves reflected by the reflective layer passing through the absorbing section so as to return to the reflective layer and to attenuate the light passing through the absorbing section via interference. Examples of the absorbing layer include absorbing layers formed by filling the light absorbing material in a recess of a metal subgrid, absorbing layers formed by film-forming the light absorbing material on an upper portion of a metal subgrid, and absorbing layers formed by oblique angle deposition of the light absorbing material on an upper portion of a metal subgrid.

To improve durability, a protective film made of a dielectric may be film-formed on surfaces of lattice-pattern projections having the reflective layer and absorbing section and floor surfaces between lattice-pattern projections.

An optical member in such a configuration can use four effects of transmission, reflection, interference, and polarization-selective light absorption to attenuate polarized waves (IL waves (s-waves)) having an electric field parallel with the lattice pattern of the reflective layer and transmit polarized waves (TM waves (p-waves)) having an electric field perpendicular with the lattice pattern. Thus, TE waves are attenuated by the polarization-selective light-absorbing effect of the absorbing section, and TE waves transmitted through the absorbing section are reflected by the lattice-patterned reflective layer functioning as a wire grid.

First Embodiment

FIG. 1 is a cross-sectional view schematically illustrating a structure of a polarizing plate according to a first embodiment. As illustrated in FIG. 1, the polarizing plate includes a transparent substrate 11 that is transparent to light of a used wavelength band, a metal grid 12 in which a reflective layer made of a metal is arranged to extend in a predetermined direction on the transparent substrate 11 at a pitch finer than a wavelength of light of a used band, a metal subgrid 13 made of the same metal as that of the reflective layer and formed on the metal grid at a pitch finer than that of the metal grid 12, and an absorbing layer 14 formed of a light absorbing material filled into a recess of the metal subgrid 13. The polarizing plate described in the first embodiment thus includes, as an absorbing section, the absorbing layer 14 formed by filling the light absorbing material in the recess of the metal subgrid 13.

The transparent substrate 11 is without particular limitation as long as it is transparent to light of the used band and can be selected as appropriate according to purpose. The phrase "transparent to light of a used band" means that the transparent substrate has a transmittance sufficient to have a transparency allowing functioning as a polarizing plate in a band of light used with the polarizing plate and does not mean a transmittance of 100%. An example of light in the used band is visible light, which has a wavelength of approximately 380 to 810 nm.

The metal grid 12 is formed by arranging metal thin-film in a striped pattern extending in the Y direction, which is the absorption axis. Thus, the metal grid 12 functions as a wire grid polarizer that, for light propagating toward and entering the surface of the transparent substrate 11 on which the wire grid is formed, attenuates polarized waves (TE waves (s-waves)) having an electric field component in a direction (Y direction) parallel to the lengthwise direction of the wire grid and transmits polarized waves (TM waves (p-waves))

having an electric field component in a direction (X direction) perpendicular to the lengthwise direction of the wire grid.

Material for the metal grid 12 is without particular limitation as long as the material has a reflective property for light in the used band; examples of materials usable in the metal grid 12 include Al, Ag, Cu, Mo, Cr, Ti, Ni, W, Fe, Si, Ge, and Te, among others, as individual metals or included in a metal alloy or a semiconductor material.

The metal subgrid 13 is constituted by the same metal as the metal grid 12. This increases strength between the metal grid 12 and the metal subgrid 13.

Furthermore, pitch of the metal subgrid 13 is preferably one half or less of the grid width. Moreover, depth of the recess of the metal subgrid 13 is preferably one half or less of the height of a projection of the metal grid. In this way, strength of the metal grid 12 and metal subgrid 13 can be maintained.

The absorbing layer 14 is formed by filling a light absorbing material in a recess of the metal subgrid 13. Furthermore, the absorbing layer 14 may be formed in all or part of the recess of the metal subgrid 13.

Moreover, the absorbing layer 14 is made of a light absorbing material such as a metal or semiconductor material exhibiting a light absorbing effect and having a refractive index with a non-zero attenuation coefficient and is selected as appropriate according to the used band of light. Examples of usable metal materials are Ta, Al, Ag, Cu, Au, Mo, Cr, Ti, W, Ni, Fe, and Sn, among others, as individual elements or in an alloy including one or more of these elements. Examples of semiconductors which may be used are Si, Ge, Te, ZnO, and silicide materials ($\beta$-FeSi$_2$, MgSi$_2$, NiSi$_2$, BaSi$_2$, CrSi$_2$, CoSi$_2$, TaSi, among others). Use of these materials can achieve high extinction ratios in a polarizing plate for the applicable visible light region. Among these materials, it is preferable to include Fe or Ta together with Si.

According to a polarizing plate in such a configuration, because the absorbing layer 14 is formed in the recess of the metal subgrid 13, increased contact area improves bond strength between the metal subgrid 13 and absorbing layer 14, thereby achieving high reliability.

Second Embodiment

Figure 2:
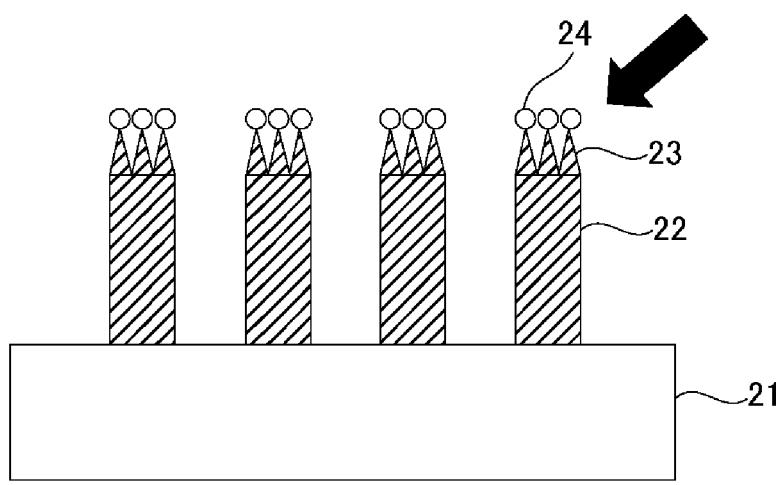
FIG. 2 is a cross-sectional view schematically illustrating a structure of a polarizing plate according to a second embodiment.

FIG. 2 is a cross-sectional view schematically illustrating a structure of a polarizing plate according to a second embodiment. As illustrated in FIG. 2, the polarizing plate includes a transparent substrate 21 that is transparent to light of a used wavelength band, a metal grid 22 in which a reflective layer made of a metal is arranged to extend in a predetermined direction on the transparent substrate 21 at a pitch finer than a wavelength of light of a used band, a metal subgrid 23 made of the same metal as the reflective layer and formed on the metal grid at a pitch finer than that of the metal grid 22, and an absorbing layer 24 formed by oblique angle deposition of a light absorbing material on an upper portion of the metal subgrid 23. Thus, a polarizing plate according to a first embodiment includes, as an absorbing section, an absorbing layer 24 formed by oblique angle deposition of a light absorbing material on an upper portion of the metal subgrid 23.

The transparent substrate 21, metal grid 22, and metal subgrid 23 are respectively the same as the transparent substrate 11, metal grid 12, and metal subgrid 13 of the first embodiment and their explanation is not repeated here.

The same light absorbing materials described in the first embodiment for the absorbing layer 14 can be used in the absorbing layer 24. To form the absorbing layer 24, the light absorbing material is deposited from an oblique direction relative to a normal direction S of the metal subgrid 23, which is the vapor deposition target surface. The angle of obliqueness with respect to the normal direction S of the metal subgrid 23 can be, for example, 60 to 80 degrees. In this way, the absorbing layer 24 can be film-formed at a desired position on the metal subgrid 23 and optical properties can be controlled.

Third Embodiment

Figure 3:
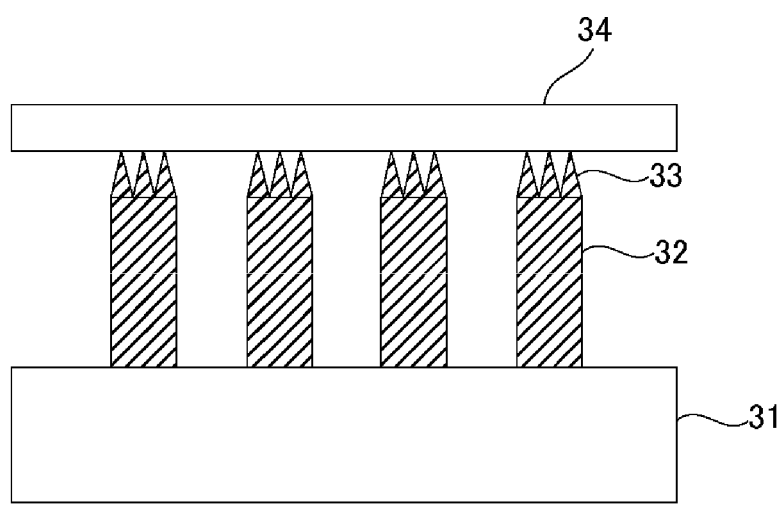
FIG. 3 is a cross-sectional view schematically illustrating a structure of a polarizing plate according to a third embodiment.

FIG. 3 is a cross-sectional view schematically illustrating a structure of a polarizing plate according to a third embodiment. As illustrated in FIG. 3, the polarizing plate includes a transparent substrate 31 that is transparent to light of a used wavelength band, a metal grid 32 in which a reflective layer made of a metal is arranged to extend in a predetermined direction on the transparent substrate 31 at a pitch finer than a wavelength of light of a used band, a metal subgrid 33 made of the same metal as the reflective layer and formed on the metal grid at a pitch finer than that of the metal grid 32, and an absorbing layer 34 made of light absorbing material film-formed on an upper portion of the metal subgrid 33. Thus, the polarizing plate described in the first embodiment includes, as an absorbing section, the absorbing layer 34 made of a light absorbing material film-formed on an upper portion of the metal subgrid 33.

The transparent substrate 31, the metal grid 32, and the metal subgrid 33 are respectively the same as the transparent substrate 11, metal grid 12, and metal subgrid 13 of the first embodiment and their explanation is not repeated here.

The same light absorbing materials described in the first embodiment for the absorbing layer 14 can be used in the absorbing layer 24. The absorbing layer 34 is film-formed so as to cover over the metal subgrid 33, and this forms an empty space in the recess of the metal grid 32. For example, the absorbing layer 34 can be film-formed by using a general-purpose sputtering system ejecting sputter particles in directions having some degree of randomness so that, even without film-forming a dielectric film, s-polarized light reflectance can be controlled using absorbing effects and interference effects.

Modified Embodiment

In the first to third embodiments described above, an absorbing layer was formed on a metal subgrid; however, the present disclosure is not limited thereto, and a dielectric layer may be film-formed on a metal subgrid and an absorbing layer may be formed on the dielectric. In this way, s-polarized light reflectance can be controlled using absorbing effects and interference effects. Moreover, a light absorbing material and dielectric may be mixed to form a mixed layer on the metal subgrid, and the light absorbing material or dielectric may have a concentration distribution with concentration tapering in the thickness direction. Examples of the dielectric include general materials such as Si oxides such as $SiO_2$, metal oxides such as $Al_2O_3$, beryllium oxide, and bismuth oxide, $MgF_2$, cryolite, germanium, titanium dioxide, silicon, magnesium fluoride, boron nitride, boron oxide, tantalum oxide, and carbon, or a combination of these. Among these, an Si oxide is preferably used.

Furthermore, whereas the first and second embodiments describe providing a metal grid on a transparent substrate, a dielectric layer may be provided on the transparent substrate and a metal grid may be formed on the dielectric layer. Moreover, the transparent substrate or the dielectric layer may be trenched to form a protruding base and a metal grid may be formed on this base. Furthermore, the base is not limited to having a rectangular cross-section and may be trapezoidal and may include curved surfaces.

2. Polarizing Plate Manufacturing Method

Next, a method for manufacturing a polarizing plate according to the present embodiments will be described. This includes forming a subgrid pattern on a surface of a metal layer film-formed on a transparent substrate that is transparent to light in a used wavelength band, forming an absorbing layer by filling a light absorbing material in a recess of the subgrid pattern, and forming a grid pattern arranged to be at a pitch finer than a wavelength of light in the used band by etching the metal layer to manufacture a polarizing plate having the transparent substrate, a metal grid in which a reflective layer made of a metal is arranged to extend in a predetermined direction on the transparent substrate at a pitch finer than a wavelength of light in the used band, a metal subgrid made of the metal formed on the metal grid at a pitch finer than that of the metal grid, and an absorbing section formed by filling the light absorbing material in a recess of the metal subgrid. According to such a method for manufacturing a polarizing plate, because the absorbing layer is formed in a recess of the metal subgrid, increased contact area increases bond strength between the metal subgrid and the absorbing layer, thus enabling high reliability.

Figure 4:
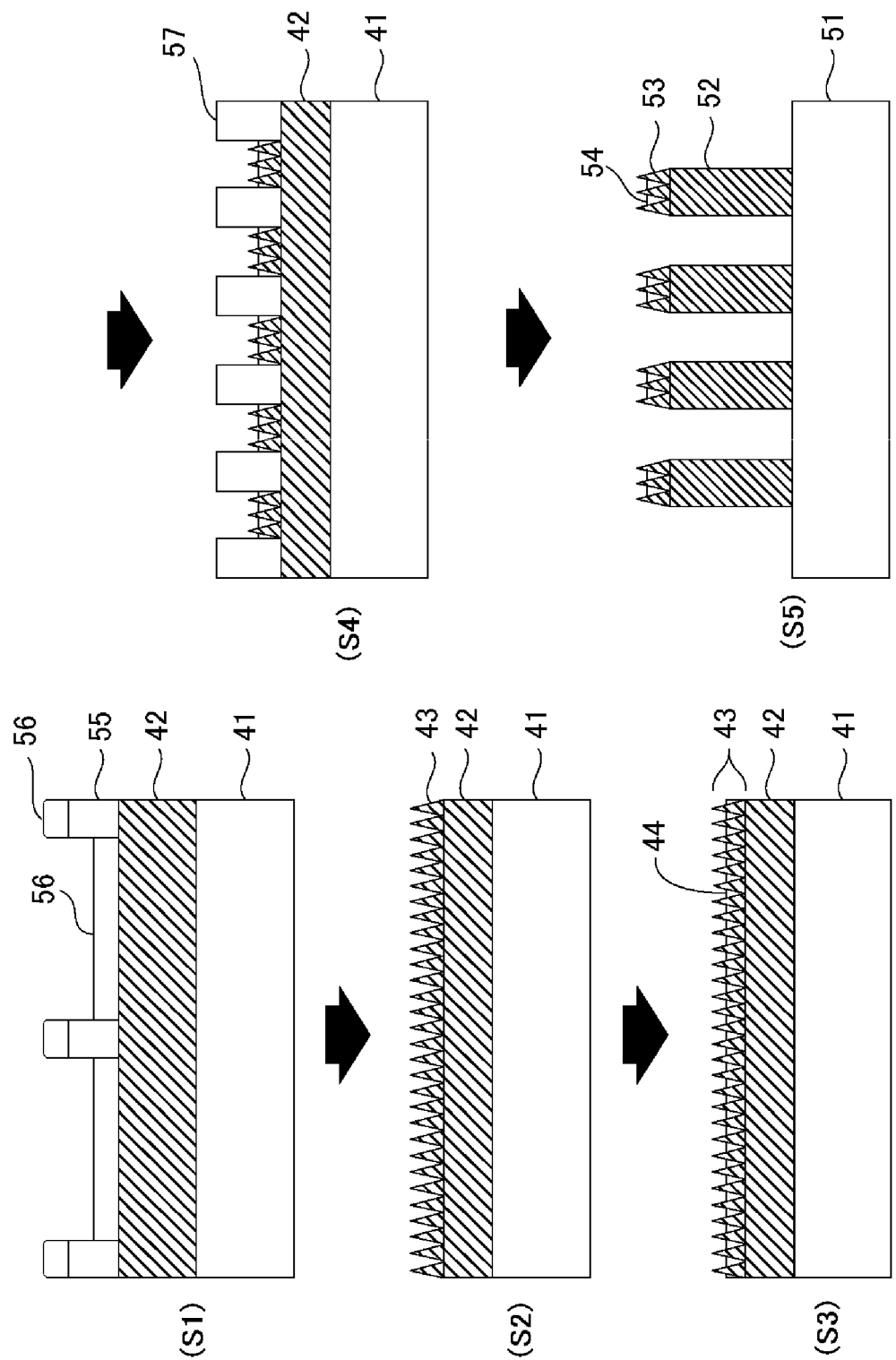
FIG. 4 is a cross-sectional view for explaining a method for manufacturing a polarizing plate.

FIG. 4 is a cross-sectional view for explaining a method for manufacturing a polarizing plate. First, onto a transparent substrate 41, a reflective layer 42 is film-formed such as by sputtering. Next, a guide pattern 55 and a block copolymer 56 are used (S1) in exposing and developing to form a subgrid pattern 43 (S2). The pitch of the subgrid pattern 53 is preferably less than one half of the width of a grid pattern. Furthermore, etching depth of the subgrid pattern 43, is preferably one half or less of the thickness of the reflective layer 42. This can maintain strength of the reflective layer 42.

The guide pattern 55, formed for example of a photoresist and anti-reflective layer, improves linearity of the subgrid pattern 43. For example, in the case of a block copolymer of polystyrene (PS) and polymethyl methacrylate (PMMA), using the guide pattern 55 can improve linearity of the subgrid pattern 43; otherwise a fingerprint-like pattern might be created in the case of not using the guide pattern 55 since microphase separation occurs due to difference in polarity of each block. It should be noted that the fingerprint-like pattern may be accepted as long as desired polarizer properties are achieved despite loss of linearity and possible degradation of polarizer properties.

The block copolymer 56 is a block copolymer produced using two monomers having different etching selectivities; for example, a block copolymer of polystyrene (PS) and polymethyl methacrylate (PMMA) can be used. Trimethylaluminum (TMA) is brought into contact and complexes with carbonyl groups of the PMMA so that TMA is incorporated into only the PMMA block; this is followed by exposure to steam ($H_2O$). This process can be repeated to oxidize the PMMA/TMA complex portions and create a mask of arranged alumina. Subsequently, $O_2$ plasma is used to remove an organic resin containing the polystyrene portion, and reactive ion etching is used to etch the reflective layer 42 to form a subgrid. Finally, the alumina mask is removed to form the subgrid pattern 43.

Figure 5:
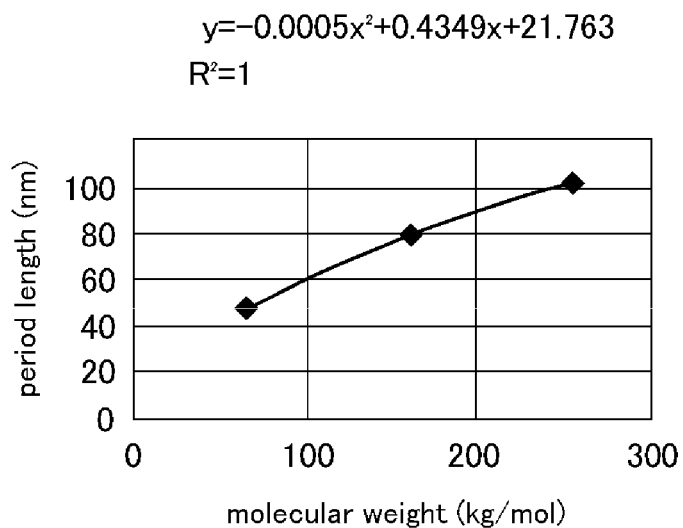
FIG. 5 is a graph representing a relation between molecular weight (molar mass) of a PS-b-PMMA block copolymer and period length of a subgrid pattern.

FIG. 5 is a graph representing a relation between molecular weight (molar mass) of a PS-b-PMMA block copolymer and period length of a subgrid pattern. It can be understood that a 200-kg/mol PS-b-PMMA block copolymer is capable of achieving a subgrid having a pitch of 100 nm or less.

Next, the absorbing layer 44 is formed in a recess of the subgrid pattern 43 (S3). For example, ALD (atomic layer deposition) or plasma CVD can be used to fill a light absorbing material in the recess of the subgrid pattern 43.

Next, a resist 57 and a photolithography or nanoprinting method are used to form a grid pattern (S4) which is transferred to the underlying reflective layer 42 by etching to form a projection constituted by the metal grid 52, the metal subgrid 53, and the absorbing layer 54. Chlorine-based plasma etching is preferable in the case of using aluminum in the reflective layer 42.

A protective film coating may be used to improve durability according to need. Examples of the protective film include silica films and water repelling agents (organic and organic-inorganic hybrids).

According to such a method for manufacturing a polarizing plate, by forming the absorbing layer 54 in a recess of the metal subgrid 53, increased contact area increases bond strength between the metal subgrid 53 and the absorbing layer 54, thus enabling high reliability.

Figure 6:
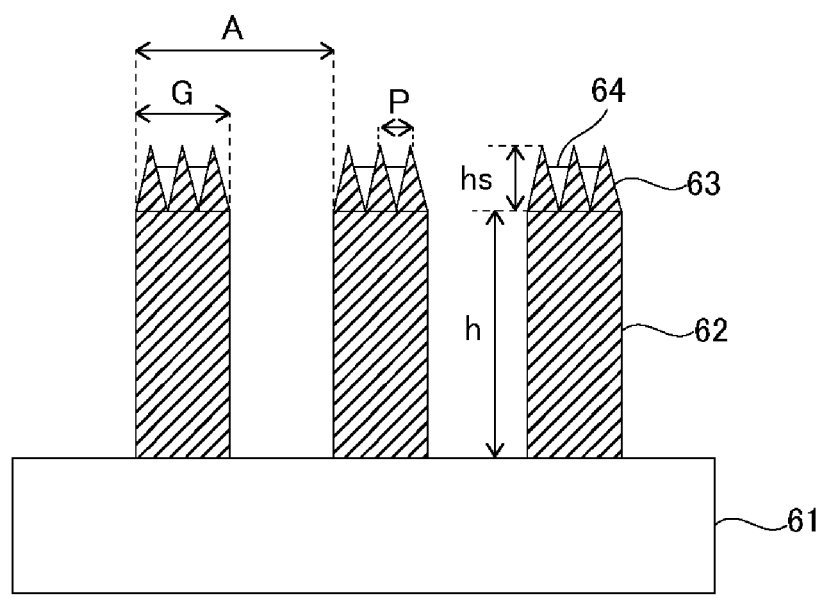
FIG. 6 is a cross-sectional view schematically illustrating a structure of a polarizing plate manufactured by the present method.
Figure 7:
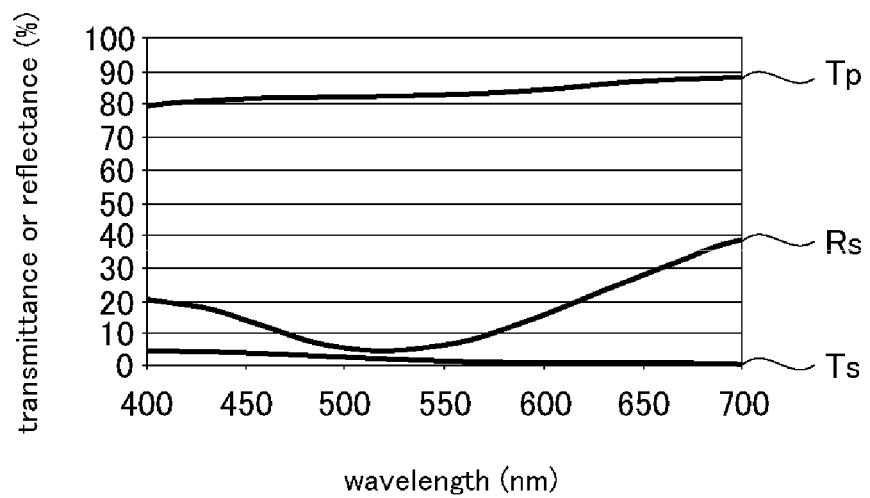
FIG. 7 is a graph representing optical properties of a polarizing plate manufactured by the present method.

FIG. 6 is a cross-sectional view schematically illustrating a structure of the polarizing plate manufactured by the present method, and FIG. 7 is a graph representing optical properties of the polarizing plate manufactured by the present method. As represented in FIG. 6, a wavelength plate included a transparent substrate 61 (EAGLE XG manufactured by CORNING INCORPORATED), a metal grid 62 in which a reflective layer made of Al is arranged on the transparent substrate 61, a metal subgrid 63 made of Al and formed on the metal grid 62, and an absorbing layer 64 made of FeSi (Fe=5 atm %) as a light absorbing material film-formed in a recess of the metal subgrid 63. Dimensions were reflective layer pitch A: 150 nm, reflective layer width G: 46 nm, reflective layer height h: 180 nm, subgrid pitch P: 23 nm, and subgrid height hs: 38 nm.

As represented in FIG. 7, the polarizing plate manufactured by the present method had significantly reduced s-polarized reflectance (Rs) in the green wavelength band (wavelengths 520 to 590 nm) important in polarizing plates, and was found to be favorable for use in a liquid crystal projector.

Alternative Manufacturing Process

In the manufacturing processes described above, an absorbing layer was formed by filling a light absorbing material in a recess of the subgrid pattern before etching a metal layer to form a grid pattern; however, the absorbing section may be formed after forming the grid pattern.

Thus, this may include forming a subgrid pattern on a surface of a metal layer film-formed on a transparent substrate that is transparent to light in a used wavelength band, forming a grid pattern arranged at a pitch finer than a wavelength of light in the used band by etching a metal layer, and vapor depositing a light absorbing material on an upper portion of the subgrid pattern to manufacture a polarizing plate having the transparent substrate, a metal grid extending in a predetermined direction in which a reflective layer made of a metal is arranged on the transparent substrate at a pitch finer than the wavelength of light of the used band, a metal subgrid made of the metal formed on the metal grid at a pitch finer than that of the metal grid, and an absorbing section formed by vapor depositing a light absorbing material on an upper portion of the metal subgrid.

As the vapor deposition method, for example, by using oblique angle deposition to form a film, the absorbing layer can be film-formed at a desired position on the metal subgrid as described in the second embodiment so that optical properties can be controlled. Moreover, as the vapor deposition method, for example, by film-forming an absorbing layer using a general-purpose sputtering system ejecting sputter particles in directions having some degree of randomness, even without film-forming a dielectric film as described in the third embodiment, s-polarized light reflectance can be controlled using absorbing effects and interference effects.

According to such a method for manufacturing a polarizing plate, because the metal subgrid is formed above the reflecting layer, increased contact area improves bond strength between the metal subgrid and the absorbing section and high reliability can be achieved.

REFERENCE SIGNS LIST 11 transparent substrate, 12 metal grid, 13 metal subgrid, 14 absorbing layer, 21 transparent substrate, 22 metal grid, 23 metal subgrid, 24 absorbing layer, 31 transparent substrate, 32 metal grid, 33 metal subgrid, 34 absorbing layer, 41 transparent substrate, 42 reflective layer, 43 subgrid pattern, 44 absorbing layer, 55 guide pattern, 56 block copolymer, 57 resist, 51 transparent substrate, 52 metal grid, 53 metal subgrid, 54 absorbing layer, 61 transparent substrate, 62 metal grid, 63 metal subgrid, 64 absorbing layer

The invention claimed is:

1. A polarizing plate comprising:
a transparent substrate that is transparent to light of a used wavelength band;
a metal grid in which a reflective layer made of a metal is arranged to extend in a predetermined direction on the transparent substrate at a pitch finer than a wavelength of light of the used band;
a metal subgrid made of the metal formed on the metal grid at a pitch finer than that of the metal grid; and
an absorbing section including a light absorbing material formed on the metal subgrid.

2. The polarizing plate according to claim 1, wherein the absorbing section is formed by filling a light absorbing material in a recess of the metal subgrid.

3. The polarizing plate according to claim 2, wherein the absorbing section is formed by film-forming a light absorbing material on an upper portion of the metal subgrid.

4. The polarizing plate according to claim 2, wherein the metal subgrid has a pitch that is less than one half of a width of the reflective layer.

5. The polarizing plate according to claim 2, wherein the metal subgrid has a recess having a depth that is one half or less than a height of a projection of the metal grid.

6. The polarizing plate according to claim 1, wherein the absorbing section is formed by film-forming a light absorbing material on an upper portion of the metal subgrid.

7. The polarizing plate according to claim 6, wherein the metal subgrid has a pitch that is less than one half of a width of the reflective layer.

8. The polarizing plate according to claim 6, wherein the metal subgrid has a recess having a depth that is one half or less than a height of a projection of the metal grid.

9. The polarizing plate according to claim 1, wherein the absorbing section is formed by oblique angle deposition of a light absorbing material on an upper portion of the metal subgrid.

10. The polarizing plate according to claim 9, wherein the metal subgrid has a pitch that is less than one half of a width of the reflective layer.

11. The polarizing plate according to claim 9, wherein the metal subgrid has a recess having a depth that is one half or less than a height of a projection of the metal grid.

12. The polarizing plate according to claim 1, wherein the metal subgrid has a pitch that is less than one half of a width of the reflective layer.

13. The polarizing plate according to claim 1, wherein the metal subgrid has a recess having a depth that is one half or less than a height of a projection of the metal grid.

14. A method for manufacturing a polarizing plate comprising:
forming a subgrid pattern on a surface of a metal layer film-formed on a transparent substrate that is transparent to light in a used wavelength band;
forming an absorbing layer by filling a light absorbing material in a recess of the subgrid pattern;
and forming a grid pattern arranged to be at a pitch finer than a wavelength of light in the used band by etching a metal layer,
to manufacture a polarizing plate having the transparent substrate, a metal grid extending in a predetermined direction in which a reflective layer made of a metal is arranged on the transparent substrate at a pitch finer than the wavelength of light of the used band, a metal subgrid made of the metal formed on the metal grid at a pitch finer than that of the metal grid, and an absorbing section formed by filling the light absorbing material in a recess of the metal subgrid.

15. A method for manufacturing a polarizing plate comprising:
forming a subgrid pattern on a surface of a metal film layer film-formed on a transparent substrate that is transparent to light in a used wavelength band;
forming a grid pattern arranged at a pitch finer than a wavelength of light in the used band by etching a metal layer; and
vapor depositing a light absorbing material on an upper portion of the subgrid pattern,
to manufacture a polarizing plate having the transparent substrate, a metal grid extending in a predetermined direction in which a reflective layer made of a metal is arranged on the transparent substrate at a pitch finer than the wavelength of light of the used band, a metal subgrid made of the metal formed on the metal grid at a pitch finer than that of the metal grid, and an absorbing section formed by vapor depositing the light absorbing material on an upper portion of the metal subgrid.

* * * * *